United States Patent
Ishigaki

(10) Patent No.: US 8,693,007 B2
(45) Date of Patent: Apr. 8, 2014

(54) DEVICE FOR MEASURING THREE DIMENSIONAL SHAPE

(75) Inventor: Hiroyuki Ishigaki, Aichi (JP)

(73) Assignee: CKD Corporation, Aichi (JP)

( * ) Notice: Subject to any disclaimer, the term of this patent is extended or adjusted under 35 U.S.C. 154(b) by 0 days.

(21) Appl. No.: 13/559,881

(22) Filed: Jul. 27, 2012

(65) Prior Publication Data

US 2013/0128282 A1     May 23, 2013

(30) Foreign Application Priority Data

Nov. 17, 2011   (JP) .................. 2011-251171

(51) Int. Cl.
*G01B 11/24*   (2006.01)

(52) U.S. Cl.
USPC ........................................... 356/610

(58) Field of Classification Search
USPC .................. 356/600–623; 382/154
See application file for complete search history.

(56) References Cited

U.S. PATENT DOCUMENTS

2010/0183194 A1 * 7/2010 Umemura et al. ............ 382/103

FOREIGN PATENT DOCUMENTS

| JP | H07-19825 A | 1/1995 |
| JP | 2001-159510 A | 6/2001 |
| JP | 2010-91570 A | 4/2010 |

OTHER PUBLICATIONS

Office Action in corresponding Japanese application No. 2011-251171 dated Oct. 22, 2013 (9 pages).

* cited by examiner

*Primary Examiner* — Tri T Ton
(74) *Attorney, Agent, or Firm* — Osha Liang LLP

(57) ABSTRACT

A device for measuring three dimensional shape includes a first height data acquisition unit for acquiring a height data specified from measurement values according to a multiplicity of light patterns related to an entirely irradiated region irradiated by all of the multiplicity of light patterns, and for using an acquired specified height data as a height data for the entirely irradiated region; a supplemental data acquisition unit for acquiring, based on the height data for the entirely irradiated region, a supplemental data relating to a partially irradiated region that is irradiated by only part of the multiplicity of light patterns; and a second height acquisition unit for specifying a fringe order of the measurement values for the partially irradiated region based on the supplemental data, and for acquiring as height data for the partially irradiated region a height data corresponding to the measurement values of the specified fringe order.

2 Claims, 7 Drawing Sheets

| First light pattern | | Height data | Second light pattern | |
|---|---|---|---|---|
| Order | First measurement value | | Second measurement value | Order |
| 3 | 300 | 1500 | -100 | 3 |
| | 200 | 1400 | -200 | |
| | 100 | 1300 | -300 | |
| | 0 | 1200 | ±400 | |
| | -100 | 1100 | 300 | 2 |
| | -200 | 1000 | 200 | |
| 2 | ±300 | 900 | 100 | |
| | 200 | 800 | 0 | |
| | 100 | 700 | -100 | |
| | 0 | 600 | -200 | |
| | -100 | 500 | -300 | |
| | -200 | 400 | ±400 | |
| 1 | ±300 | 300 | 300 | 1 |
| | 200 | 200 | 200 | |
| | 100 | 100 | 100 | |
| | 0 | 0 | 0 | |
| | -100 | -100 | -100 | |
| | -200 | -200 | -200 | |
| | ±300 | -300<br>-400 | -300 | |
| | 200 | | ±400 | |

FIG. 3

DEVICE FOR MEASURING THREE DIMENSIONAL SHAPE

CROSS-REFERENCE TO RELATED APPLICATIONS

This application claims priority to Japanese Patent Application No. 2011-251171 filed on Nov. 17, 2011 in Japan.

BACKGROUND OF INVENTION

1. Field of the Invention

The present invention relates to a device for measuring three dimensional shape.

2. Background Art

Generally, when electronic components are mounted on a printed board, firstly, cream solder is printed at certain positions on the electrode pattern. Thereafter, the electronic components are temporarily fixed to the printed board by use of viscosity of the cream solder. Thereafter, the aforementioned printed board is conveyed to a reflow furnace, the printed board is subjected to a certain reflow step, and soldering is performed. In recent years, inspection of the printed state of the cream solder has been required at a stage prior the printed board being conveyed to the reflow furnace. A device for measuring three dimensional shape is used during this inspection.

In recent years, there have been proposals for various types of devices for measuring three dimensional shape by the use of light (so-called contact-free devices for measuring three dimensional shape), such as technology relating to devices for measuring three dimensional shape using the phase shift method.

A device for measuring three dimensional shape using this phase shift method uses an irradiation unit composed of a light source and a sinusoidal wave pattern filter and irradiates a light pattern having a sinusoidal wave-shaped (i.e., stripe shaped) light intensity distribution upon an object being measured (i.e., printed board in this case). Then, a point on the board is observed using an imaging unit disposed directly above the board. A CCD camera or the like composed of a lens, and imaging element, or the like is used as the imaging unit. In this case, the intensity I of light at a point P on the image plane is given by the below listed formula:

$$I = e + f \times \cos\phi$$

(within the formula, e=non-modulated light noise (offset component), f=sine wave contrast (reflectivity), and $\phi$=phase imparted by roughness of the object).

During irradiation, the light pattern is moved, and the phase is changed, for example, in 4 stages as $\phi+1$, $\phi+\pi/2$, $\phi+\pi$, and $\phi+3\pi/2$. Images of the corresponding intensity distributions (I0, I1, I2, and I3, respectively) are read, and the modulated component a is found based on the below listed formula.

$$\alpha = \arctan\{(I3-I1)/(I0-I2)\}$$

Using this modulated component, the three dimensional coordinates (X, Y, Z) of the point P on the object to be measured, such as a cream solder or the like, are found, and these coordinates are used to measure three dimensional shape (particularly height) of the object to be measured.

However, the actual object to be measured may include both high points and low points. In the case of a cream solder, for example, although there are thin film-like creams solders, there are also protruding cream solders that assume a circular truncated cone shape. When the gap between lines of the irradiated light pattern is widened in concert with the maximum height among such objects to be measured, resolution ability becomes poor, and precision of the measurement may worsen. On the other hand, although it is possible to attempt to improve precision by narrowing the gap between the lines, this may result an insufficient range of height capable of measurement (e.g., due to change of the fringe orders).

Therefore, technology has been proposed that combines light patterns having different pitches (i.e., by combining a light pattern having a short pitch and a light pattern having a long pitch, see Patent Document 1). In this manner, it is possible to prevent loss of resolution in the height direction, and it is possible to widen the height range that is capable of measurement.

PRIOR ART DOCUMENTS

[Patent Document 1] Japanese Unexamined Laid-open Patent Application No. 2001-159510

However, when the light source 1 is arranged at only a single location as in the aforementioned conventional technology, shadowed parts may occur where the light pattern does not irradiate the object being measured (object to be measured). Thus, such parts might not be suitably measured.

On the other hand, even if a configuration were to be adopted that irradiates respective light patterns having different pitches from two light sources, there would be parts of the object being measured that are irradiated by the light pattern of just one of the pitches. Therefore, the aforementioned type of high resolution measurement with a wide dynamic range might not be possible for such parts of the object being measured.

This issue is inherent to devices used in various fields for measurement of three dimensional shapes and is not limited to the measurement of the height of cream solder printed on a printed board or the like.

The present invention was developed in consideration of the above circumstances. An object of one or more embodiments of the present invention is to provide a device for measuring three dimensional shape that is capable of realizing more highly precise measurement during three dimensional measurement using the phase shift method.

SUMMARY OF INVENTION

Various embodiments of the invention for addressing the above issue will be explained separately below. As may be required, the characteristic operational effects of the embodiments will also be described.

A first embodiment of the claimed invention is directed to a device for measuring three dimensional shape including a multiplicity of irradiation units, an imaging unit, and an image processing unit. Each of the irradiation units is configured to irradiate an object to be measured from a respective different position using a multiplicity of light patterns having a stripe-shaped light intensity distribution and differing pitches. The imaging unit is configured image the object to be measured irradiated by each of the light patterns. The image processing unit is configured to perform three dimensional measurement based on image data imaged by the imaging unit. The image processing unit includes a measurement value acquisition unit, a measurement value acquisition unit, a first height data acquisition unit, a supplemental data acquisition unit, and a second height acquisition unit. The measurement value acquisition unit performs three dimensional measurement by the phase shift method based on a multiplicity of image data. The measurement value acquisition unit performs three dimensional measurement by the phase shift method based on a multiplicity of image data of a multiplicity of multi-phase shift light patterns imaged by respective irradiating using each of the multi-phase shift light patterns and by imaging by the imaging unit, and uses the measurement values of the three dimensional measurement as measurement values according to each of the light patterns. The first height data acquisition unit acquires a height data determined from the measurement values according to the multiplicity of light patterns related to an entirely irradiated region irradiated by all of the multiplicity of light patterns, and uses the acquired specified height data as a height data for the entirely irradiated region. The supplemental data acquisition unit acquires, based on the height data for the entirely irradiated region, a supplemental data relating to a partially irradiated region that is irradiated by only part of the multiplicity of light patterns. The second height acquisition unit specifies a fringe order of the measurement values for the partially irradiated region based on the supplemental data, and acquires as height data for the partially irradiated region a height data corresponding to the measurement values of the specified fringe order.

According to the first embodiment of the claimed invention, based on multiple image data obtained by irradiating multiple light patterns of different pitches upon the object to be measured from mutually different positions, three dimensional measurement is performed by the phase shift method, and the resultant measurement values are acquired as measurement values according to each light pattern. Then, the height data specified by the measurement values according to the multiple light patterns are acquired as height data of the object to be measured. This allows the obtaining of two results, i.e., the ability to increase the range of height capable of measurement (an advantage of the use of a light pattern having a long pitch) and the ability to perform high resolution and highly accurate measurement (an advantage of use of a light pattern having a short pitch). As a result, it is possible to perform high resolution measurement over a wide dynamic range, and it is possible to realize measurement of higher precision.

However, due to specification of the height data of the object to be measured based on measurement values according to multiple light patterns, partially missing data parts occur in regions of partial irradiation, i.e., regions that are irradiating by just some of the light patterns among the multiple light patterns.

Therefore, according to the first embodiment of the claimed invention, for an entirely irradiated region entirely irradiated by the multiple light patterns, the height data specified from the measurement values according to the multiple light patterns is acquired as the height data for the entirely irradiated region. On the other hand, for a partially irradiated region irradiated by only part of the multiple light patterns, supplemental data based on height data according to the entirely irradiated region are calculated, and thereafter based on the calculated supplemental data, the fringe orders of the measurement values of the partially irradiated region are specified, and height data corresponding to the measurement values of these fringe orders are acquired as height data for the partially irradiated region.

By this means, it is naturally possible to acquire more highly precise height data for the entirely irradiated region that is irradiated entirely by the multiple light patterns, and it is also possible to acquire more highly precise height data for the partially irradiated region that is irradiated by only part of the multiple light patterns.

If the shape included in the partially irradiated region is a relatively flat shape, then it is thought that the supplemental data obtained by linear supplementation or the like can be adopted without modification as the height data for the partially irradiated region. However, shape of the partially irradiated region of an object to be measured such as cream solder or the like may differ from such a shape, and it is thought that the partially irradiated region, for example, may have an uneven shape with relatively great undulation. Therefore, for such a partially irradiated region, rather than simply adopting the unmodified measurement values (height values corresponding to the measurement values for a certain fringe order) for this partially irradiated region, values are preferably obtained that are closer to the true values.

A second embodiment of the claimed invention is directed to a device for measuring three dimensional shape including a first irradiation unit, a second irradiation unit, an imaging unit, and an image processing unit. The first irradiation unit is configured to irradiate a first light pattern of a first pitch and having a striped light intensity distribution from a first position upon an object to be measured. The second irradiation unit is configured to irradiate a second light pattern of a second pitch and having a striped light intensity distribution from a second position upon an object to be measured, the second pitch being longer than the first pitch, and the second position being different from the first position. The imaging unit is configured to image the object to be measured irradiated by the light patterns. The image processing unit performs three dimensional measurement based on an image data imaged by the imaging unit. The imaging processing unit includes a first measurement, a second measurement value acquisition unit, a first height data acquisition unit, a supplemental data acquisition unit, and a second height acquisition unit. The first measurement value acquisition unit performs three dimensional measurement by the phase shift method based on a multiplicity of image data obtained by multiply irradiating the first light pattern using multiple different phases and by the imaging by the imaging unit, and acquires as a first measurement value the measurement value obtained by the three dimensional measurement of the first measurement value acquisition unit. The second measurement value acquisition unit performs three dimensional measurement by the phase shift method based on a multiplicity of image data obtained by multiply irradiating the second light pattern using multiple different phases and by the imaging by the imaging unit, and acquires as a second measurement value the measurement value obtained by the three dimensional measurement of the second measurement value acquisition unit.

The first height data acquisition unit acquires a height data specified from the first measurement value and the second measurement value relating to an entirely irradiated region irradiated by both the first light pattern and the second light pattern, and uses the acquired specified height data as a height data for the entirely irradiated region. The supplemental data acquisition unit acquires, based on the height data for the entirely irradiated region, a supplemental data relating to a partially irradiated region that is irradiated by only the first light pattern or the second light pattern. The second height acquisition unit specifies a fringe order of the first measurement value or the second measurement value for the partially irradiated region based on the supplemental data, and acquires as height data for the partially irradiated region a height data corresponding to the first measurement value or the second measurement value of the fringe order that was specified.

According to the second embodiment of the claimed invention, three dimensional measurement is performed by the phase shift method based on multiple image data obtained by irradiating the object to be measured from a first position using a first light pattern of a first pitch that has phase varied over multiple phases, and the results of the three dimensional measurement are acquired as the first measurement values. Also three dimensional measurement is performed by the phase shift method based on multiple image data obtained by irradiating the object to be measured from a second position using a second light pattern of a second pitch that has phase varied over multiple phases, and the results of the three dimensional measurement are acquired as the second measurement values. Then, the height data specified from the first measurement values and the second measurement values are acquired as the height data of the object to be measured. This allows the obtaining of two results, i.e., the ability to increase the range of height capable of measurement (an advantage of the use of a light pattern having a long pitch) and the ability to perform high resolution and highly precise measurement (an advantage of use of a light pattern having a short pitch). As a result, it is possible to perform high resolution measurement over a wide dynamic range, and it is possible to perform measurement of higher precision.

However, due to the specification of the height data of the object to be measured based on the first measurement values and the second measurement values, a part where data is missing occurs in the partially irradiated region where only the first light pattern or the second light pattern is irradiated.

Thus, according to the second embodiment of the claimed invention, in the entirely irradiated region irradiated by both of the light patterns, the height data specified from the first measurement values and the second measurement values is acquired as the height data for the entirely irradiated region. However, in the partially irradiated region irradiated by only the first light pattern or the second light pattern, supplemental data are calculated based on the height data for the aforementioned entirely irradiated region, and thereafter based on this supplemental data, the fringe orders of the first measurement values and the second measurement values for this partially irradiated region are specified, and the height data corresponding to these fringe orders of the first measurement values and the second measurement values are acquired as the height data for this partially irradiated region.

By this means, more highly precise height data can be acquired for the partially irradiated region irradiated by only one of the two light patterns, and naturally more highly precise height data can also be acquired for the entirely irradiated region irradiated by both the first light pattern and the second light pattern.

If the shape included in the partially irradiated region is a relatively flat shape, then it is thought that the supplemental data obtained by linear supplementation or the like can be adopted without modification as the height data for the partially irradiated region. However, shape of the partially irradiated region of an object to be measured such as cream solder or the like may differ from such a shape, and it is thought that the partially irradiated region, for example, may have an uneven shape having relatively large undulations. Therefore, for such a partially irradiated region, rather than simply adopting the unmodified measurement values (height values corresponding to the measurement values for a certain fringe order) for this partially irradiated region, values are preferably obtained that are closer to the true values.

The third embodiment of the claimed invention is the device for measuring three dimensional shape according to the second embodiment of the claimed invention; where, as seen in a planar view looking along the imaging direction (approximately vertical direction) of the imaging unit, the first irradiation unit and the second irradiation unit are opposingly disposed at positions so as to sandwich the object to be measured therebetween.

According to the third embodiment of the claimed invention, there is less concern that parts may occur that are not irradiated by both the first light pattern and the second light pattern, and the effect of the second embodiment of the claimed invention can be realized with more certainty.

The fourth embodiment of the claimed invention is the device for measuring three dimensional shape according to the second embodiment of the claimed invention; where the device for measuring three dimensional shape includes a pair of the first irradiation units and a pair of the second irradiation units; and as seen in a planar view looking along the imaging direction of the imaging unit and centered on the object to be measured, the first irradiation units and the second irradiation units are alternatingly disposed with 90° spacing therebetween.

According to the fourth embodiment of the claimed invention, it is possible to greatly reduce the proportion of partially irradiated regions that are irradiated by only the first light pattern or the second light pattern, in comparison to a configuration, as per the third embodiment of the claimed invention, that provides two pairs of opposing first irradiation units and second irradiation units and disposes each of irradiation units with 90° spacing centered on the object to be measured. As a result, precision of the measurement can be further improved.

Other aspects and advantages of the invention will be apparent from the following description and the appended claims.

BRIEF DESCRIPTION OF DRAWINGS

FIG. 3 is a drawing for explanation of the relationship between the measured height data or the like and resolution according to each light pattern.

DETAILED DESCRIPTION

One or more embodiments of the claimed invention will be explained below while referring to figures.

Figure 1:
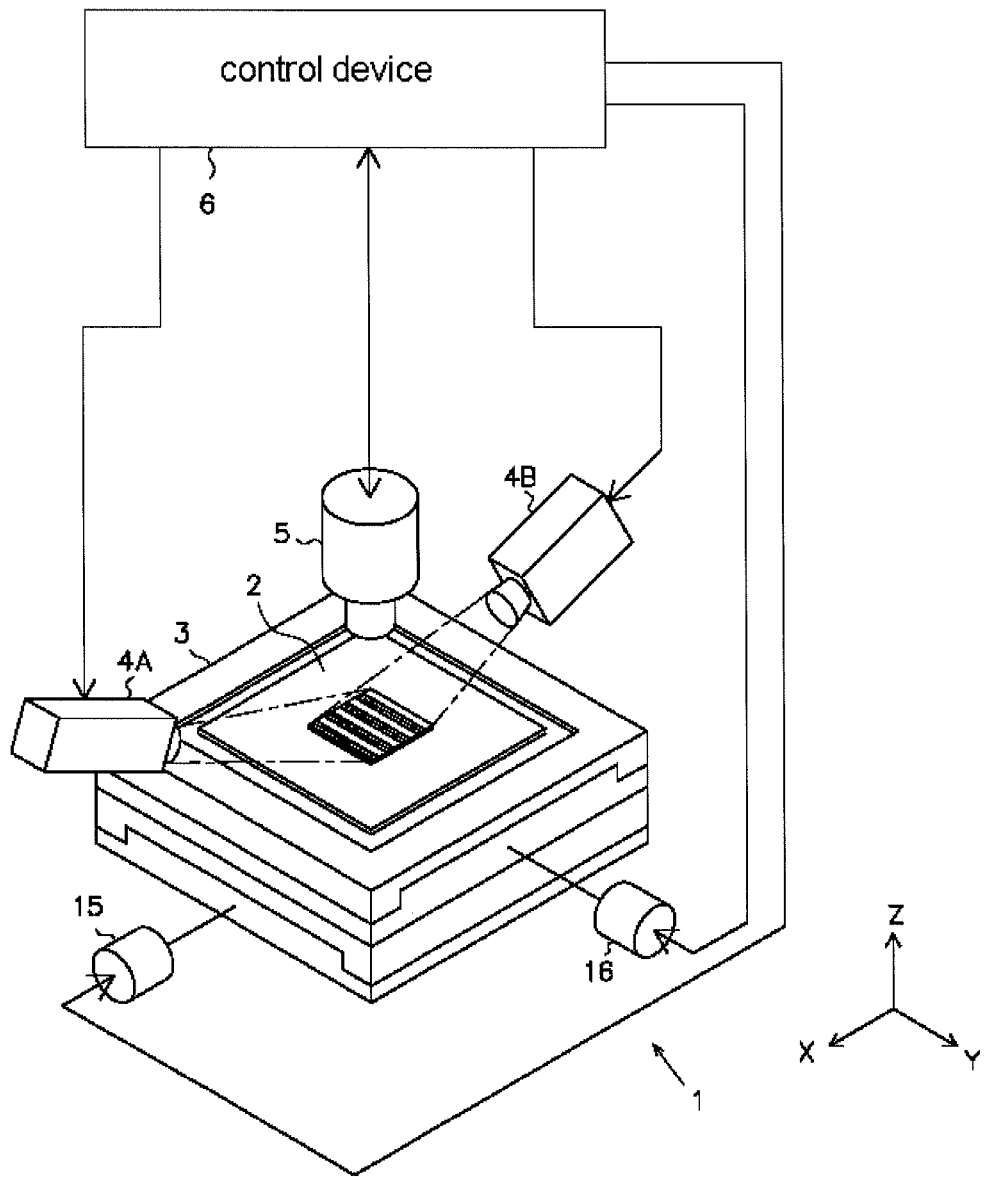
FIG. 1 is a schematic tilted-perspective view showing a board inspection apparatus according to one or more embodiments of the present invention.

FIG. 1 is a schematic structural diagram showing a board inspection apparatus 1 equipped with a device for measuring three dimensional shape of one or more embodiments. As shown in this figure, the board inspection apparatus 1 is equipped with a carrying stage for carrying a printed board 2 as a object to be measured produced by printing cream solder H (see FIG. 4, etc.) as the measurement subject, two irradiation devices (i.e. first irradiation device 4A as the first irradiation unit, and second irradiation device 4B as the second irradiation unit) for irradiation of a certain light pattern from above at a tilted angle upon the surface of the printed board 2, a camera 5 as an imaging unit for imaging the irradiated part of the printed board 2, and a control device 6 for execution of various types of control within the board inspection apparatus 1 and for image processing and calculation processing.

Each of the irradiation devices 4A and 4B is equipped with a respective known liquid crystal optical shutter so as to be capable of irradiating from an upward tilted direction upon the printed board 2 a striped light pattern of a phase that changes in increments corresponding to ¼ pitch. In the present embodiment, the light pattern is set such that the light pattern is irradiated along the x-axis direction and parallel to a pair of sides of the rectangular shaped printed board 2. That is, the lines of the light pattern are irradiated orthogonally to the x-axis direction and parallel to the y-axis direction.

Moreover, the irradiation devices 4A and 4B are disposed at opposing positions so as to sandwich the printed board 2 therebetween in a planar view (x-y plane) as seen by looking in the imaging direction of the camera 5 (approximately vertical direction, z-axis). The position of placement of the first irradiation device 4A corresponds to the first position, and the position of placement of the second irradiation device 4B corresponds to the second device.

Each of the irradiation devices 4A and 4B of the present embodiment is configured so as to be capable of irradiating a respective light pattern that has a different stripe pitch. More specifically, the first irradiation device 4A irradiates a first light pattern that has a pitch of 600 μm, and the second irradiation device 4B irradiates a second light pattern that has a pitch of 800 μm. In the present embodiment, 600 μm corresponds to the first pitch, and 800 μm corresponds to the second pitch.

By this means as shown in FIG. 3, the first light pattern can be used for measurement of height in 100 μm slices within a range from −300 μm to +300 μm, for example, at points on the measurement subject at heights such as −300 μm, −200 μm, −100 μm, etc. A height of +300 μm corresponds to −300 μm height when the fringe order is incremented by 1.

On the other hand, the second light pattern can be used for measurement of height in 100 μm slices within a range from −400 μm to +400 μm, for example, at points on the measurement subject at heights such as −400 μm, −300 μm, −200 μm, etc. A height of +400 μm corresponds to −400 μm height when the fringe order is incremented by 1.

In each of the irradiation devices 4A and 4B, light from a non-illustrated light source is conducted to a pair of condenser lenses through an optical fiber, and the condenser lenses are used for forming parallel light. This parallel light passes through a liquid crystal element and is conducted to projection lens disposed within a constant-temperature control device. Then, the light patterns of 4 different phases are irradiated from the projection lens. Due to use of a respective liquid crystal optical shutter in this manner in each of the irradiation devices 4A and 4B, when the striped light pattern is generated, intensity of the light pattern approaches that of an ideal sinusoidal wave so that measurement resolution of the three dimensional measurement becomes improved.

Moreover, phase shift of the light pattern can be electronically controlled, and it becomes possible for the control system to become compact.

Motors 15 and 16 are provided for the carrying stage 3. The printed board 2 carried on the carrying stage 3 is slid in an arbitrary direction (x-axis direction and y-axis direction) according to drive control by the control device 6.

The camera 5 is composed of a lens, imaging element, and the like. A CCD sensor is used as the imaging element in this embodiment. However, the imaging element is not limited to this type of imaging element, and for example, a CMOS or the like imaging element may be adopted.

Figure 2:
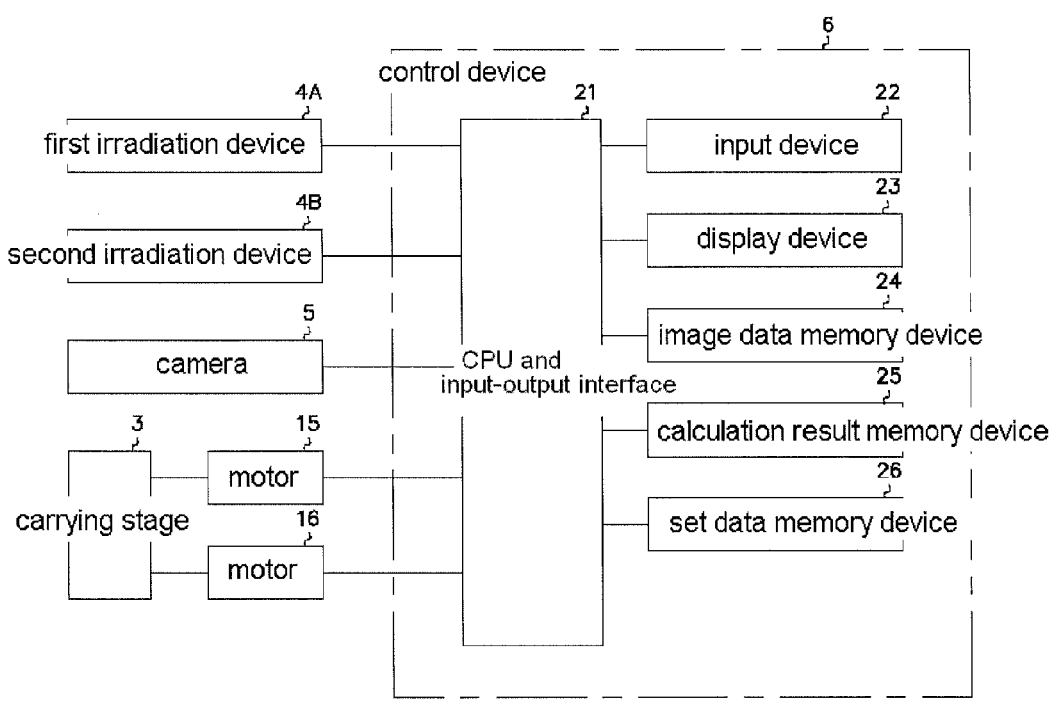
FIG. 2 is a block diagram showing the electrical configuration of the board inspection apparatus.

The electronic configuration of the control device 6 will be explained next. As shown in FIG. 2, the control device 6 is equipped with: a CPU and input-output interface 21 for performing overall control of the board inspection apparatus 1; an input device 22 as an input unit composed of a keyboard, mouse, or touch panel; a display device 23 as a display unit that has a CRT, liquid crystal display, or the like display screen; an image data memory device 24 for memory of image data or the like based on imaging by the camera 5; a calculation result memory device 25 for memory of each type of calculation result; and a set data memory device 26 for storing various types of information beforehand. Furthermore, each of these devices 22 through 26 communicates electrically with the CPU and the input-output interface 21.

Details of processing during three dimensional measurement executed using the control device 6 will be explained below. The control device 6 performs drive control of the motors 15 and 16 to cause movement of the printed board 2 so as to align a certain inspection area E on the printed board 2 with the field of the camera 5. Surface of the printed board 2 is sub-divided beforehand into areas, each of a unit size that is the same as the size of the field of view of the CCD camera 5, and the inspection area E is one area within the sub-divided surface area of the printed board 1.

At this time, the control device 6 operates the first irradiation device 4A to start irradiation of the first light pattern (pitch=600 μm) and controls sequential switching between 4 types of irradiation to cause shifting of the phase of the first light pattern in increments corresponding to ¼ pitch. During phase-shifted irradiation of the first light pattern in this manner, the control device 6 controls and operates the camera 5 to obtain 4 images of image data by imaging the inspection area E during each of these irradiations.

Based on all of the image data obtained as 4 images, the control device 6 performs various types of image processing. Based on the widely-known phase shift method, and as explained in the Background of the Invention, height is measured for each coordinate (pixel), and the resultant measurement value is stored as the first measurement value. The function for performing this processing is executed by the first measurement value acquisition unit in the present embodiment.

Then, the control device 6 performs control to drive the second irradiation device 4B to cause the start of irradiation of the second light pattern (pitch=800 μm), and the control device 6 controls sequential switching between 4 types of irradiation to cause shifting of the phase of the first light pattern in increments corresponding to ¼ pitch. During phase-shifted irradiation of the first light pattern in this manner, the control device 6 also controls and operates the camera 5 to obtain 4 images of image data by imaging the inspection area E during each of these irradiations.

The control device 6 performs various types of image processing based on each of the obtained light pattern image data (i.e. the data of 4 images), and then based on the widely-known phase shift method, the control device performs height measurement for each coordinate (pixel). These measurement values are stored as the second measurement values. The function for performing this processing is executed by the second measurement value acquisition unit in the present embodiment.

Figure 4:
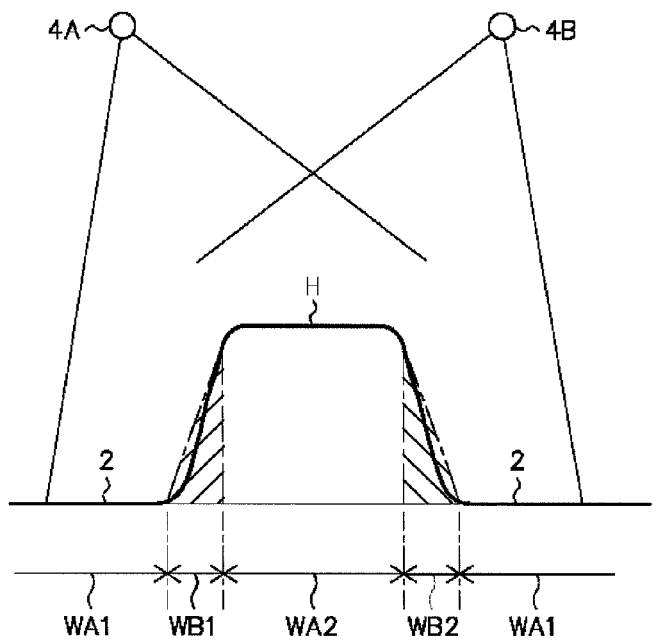
FIG. 4 is a schematic drawing showing the state of irradiation by each of the light patterns from each of the irradiation devices upon the cream solder.
Figure 5:
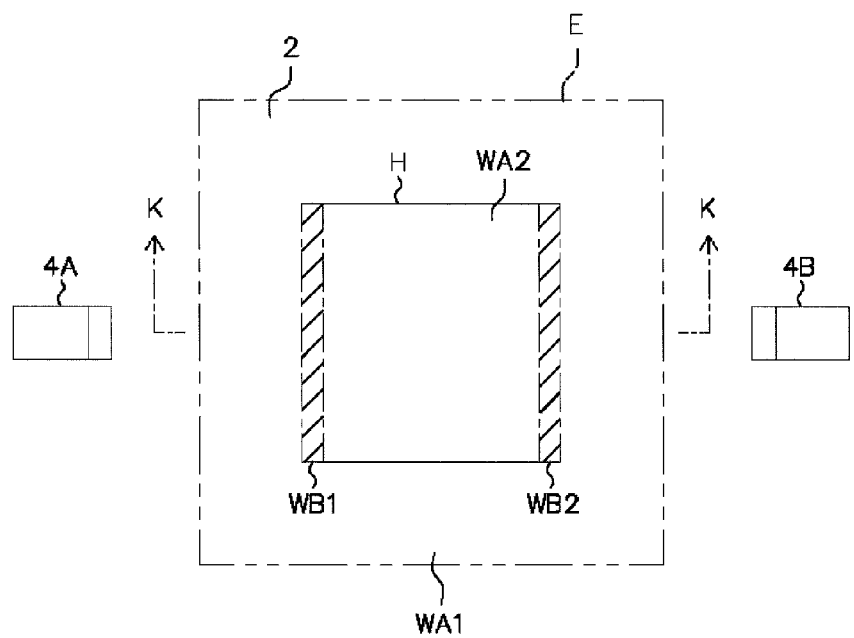
FIG. 5 is a planar schematic view showing the cream solder irradiated by each of the light patterns and the part peripheral to the cream solder.

The control device 6 irradiates both the first light pattern and the second light pattern within the inspection area E, and for the entirely irradiation regions WA1 and WA2 (see FIGS. 4 and 5) where it was possible to acquire both the aforementioned first measurement values and second measurement values, height data derived from these first measurement values and second measurement values are acquired as the height data relating to these entirely irradiated regions WA1 and WA2. The function for performing this processing is executed by the first height data acquisition unit in the present embodiment. FIG. 4 is a schematic side view showing the state of each of the irradiated light patterns from the irradiation devices 4A and 4B irradiated onto a cream solder H, i.e. measurement subject. FIG. 5 is a top schematic view showing the irradiated state of that cream solder and the peripheral parts during irradiation using each of the light patterns.

As made clear from measurement table shown in FIG. 3, when the value obtained as the first measurement value for a certain point of the measurement subject, for example, is +100 the candidate height data for this point of the measurement subject become +100 μm (fringe order=1), +700 μm (fringe order=2), and +1,300 μm (fringe order=3).

If a measurement value was obtained as a second measurement value for the same point of the measurement subject, for example, as −100 μm, then the height data of this point of the measurement subject can be specified as +700 μm.

Figure 6:
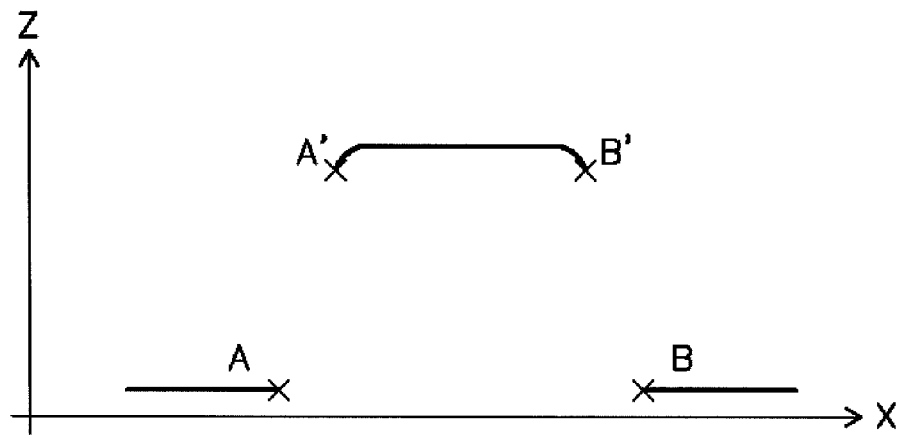
FIG. 6 is a chart plotting height data of the entirely irradiated region at the K-K line cross section of FIG. 5.

However, for the partially irradiated region WB1 (irradiated only by the first light pattern and not irradiated by the second light pattern) and for the partially irradiated region WB2 (irradiated only by the second light pattern and not irradiated by the first light pattern) among the areas of the aforementioned inspection area E, there are missing parts in the respective data (i.e., in FIG. 6, see interval A-A' and interval B-B'). FIG. 6 is a chart plotting the height data of the entirely irradiated regions WA1 and WA2 at the face of the K-K cross section indicated in FIG. 5.

Then, based on the height data of the aforementioned entirely irradiated regions WA1 and WA2, the supplemental data relating to the aforementioned partially irradiated regions WB1 and WB2 are acquired. The function for performing this processing is executed by the supplemental data acquisition unit in the present embodiment.

Figure 7:
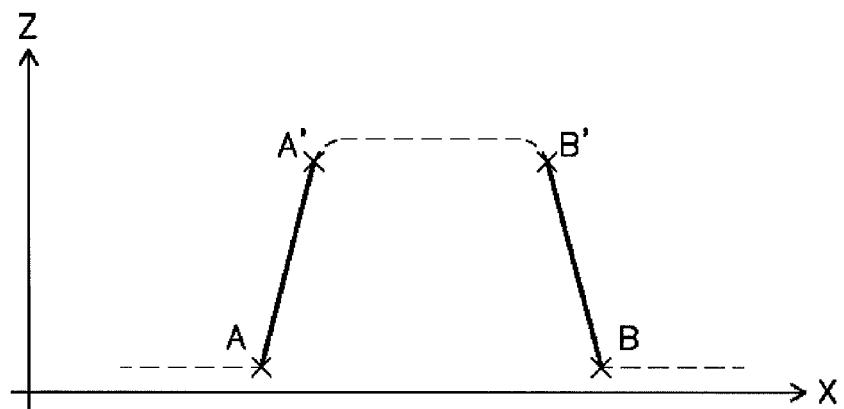
FIG. 7 is a chart plotting supplemental data of the partially irradiated region at the K-K line cross section of FIG. 5.

In the present embodiment, linear supplementation is performed (see FIG. 7) to connect between the height data A and A' of the entirely irradiated regions WA1 and WA2 at either edge of the partially irradiated region WB1 (part of missing data) occurring in the planar view irradiation direction (lateral direction of FIG. 5) of the first light pattern or the second light pattern, and this linear supplementation also connects between the height data B and B' of the entirely irradiated regions WA1 and WA2 at both edges of the partially irradiated region WB2. FIG. 7 is a chart plotting the supplemental data relating to the partially irradiated regions WB1 and WB2 at the K-K line cross section of FIG. 5.

Figure 8:
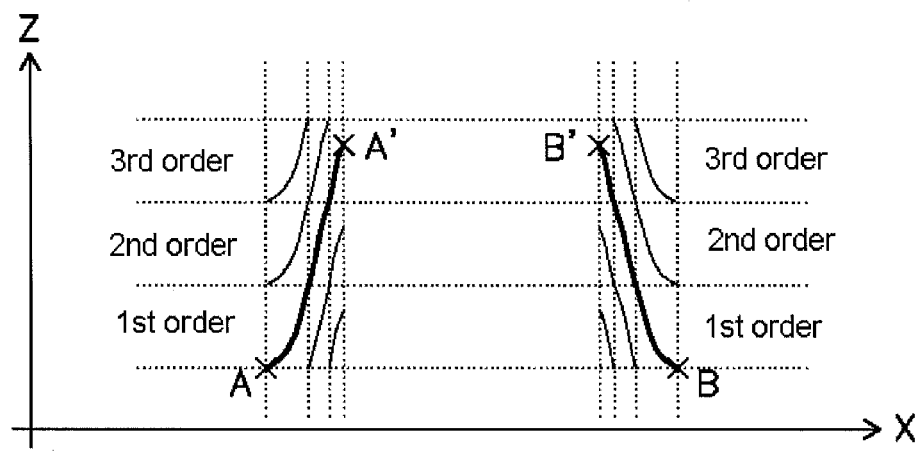
FIG. 8 is a chart plotting height data for the partially irradiated region that were specified based on the supplemental data shown in FIG. 7.

Thereafter, based on the aforementioned supplemental data relating to the partially irradiated region WB1, the fringe order of a first measurement value relating to this partially irradiated region WB 1 is specified, and height data corresponding to the first measurement value of this fringe order are acquired as the height data relating to this partially irradiated region WB1 (see FIG. 8). In the same manner, based on the aforementioned supplemental data relating to the partially irradiated region WB2, the fringe order of a second measurement value relating to this partially irradiated region WB2 is specified, and height data corresponding to the second measurement value of the fringe order are acquired as the height data relating to this partially irradiated region WB2 (see FIG. 8). The function for performing this processing is executed by the second height data acquisition unit in the present embodiment. FIG. 8 is a chart that plots the height data specified based on the supplemental data shown in FIG. 7 and relating to the partially irradiated regions WB1 and WB2.

In the present embodiment, the fringe order (fringe order of the range including the supplemental data) most close to the supplemental data for to a certain measurement point is specified as the fringe order for that measurement subject point.

For example, if the supplemental data for a certain measurement subject point within the partially irradiated region WB1 (i.e., region irradiated by only the first light pattern) is +1050 μm, then the fringe order of the first measurement value for this measurement subject point is specified as 3 (see FIG. 3).

Then, if, for example, the value obtained as the first measurement value for the aforementioned measurement subject point was −100 μm, then the height data for this measurement subject point is specified to be +1100 μm, i.e. a value corresponding to the first measurement value when the fringe order is 3.

Figure 9:
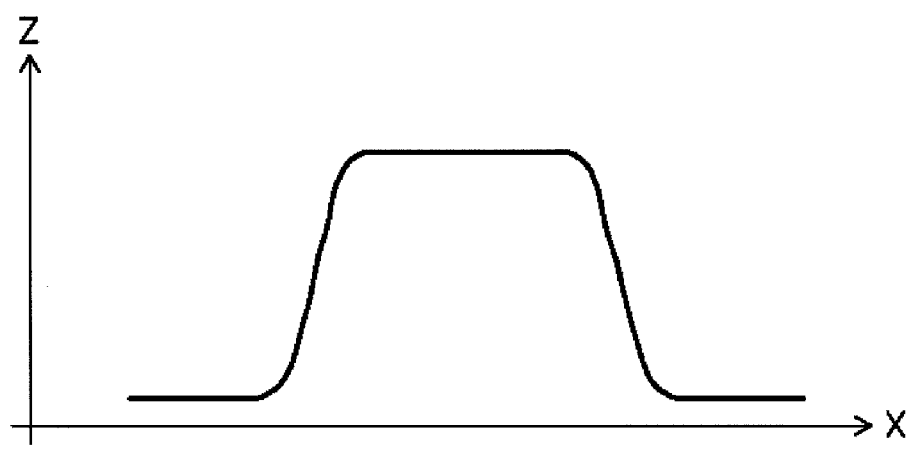
FIG. 9 is a chart plotting the height data at the K-K line cross section of FIG. 5.

When the aforementioned series of processing steps has ended, measurement data for the entire imaging visual field (i.e. entire inspection area E) are completed. FIG. 9 is a chart of a plot of the height data at the K-K line cross section of FIG. 5.

The measurement data for each of the inspection areas E obtained in this manner are stored by the calculation result memory device 25 of the control device 6. Thereafter, based on the measurement data for each of these inspection areas E, the printing range of cream solder H higher than a standard surface is detected, and by integration of the height of each position within this region, the amount of the printed cream solder H is calculated. Thereafter, a comparison is made between standard data previously stored in the set data memory device 26 and data such as position, surface area, height, amount, or the like of the cream solder found in this manner. Then, based on a determination of whether or not the results of this comparison are within a permissible range, a pass-fail determination is made for the printed state of the cream solder H in this inspection area E.

During the execution of this processing, the control device 6 controls and drives the motors 15 and 16 to cause the printed board 2 to move to the next inspection area E, and thereafter, the aforementioned series of processing steps is repeated for each of the inspection areas E.

While the inspection area E is shifted by control of the control device 6 of the board inspection apparatus 1 of the present embodiment in this manner, sequential image processing is performed so that three dimensional measurement is performed that includes measurement of height of the cream solder H on the printed board 2, and it becomes possible to quickly and reliably inspect the printed state of the cream solder.

According to the present embodiment in the aforementioned manner, it is possible to obtain two effects, i.e., to increase the range of height capable of measurement (an advantage of using the second light pattern having a long pitch), and to realize highly precise measurement at high resolution (an advantage of using the first light pattern having a short pitch). As a result, high resolution measurement can be performed with a wide dynamic range, and it is possible to realize increasingly precise measurement.

In particular, according to the present embodiment, for the entirely irradiated regions WA1 and WA2 irradiated by both of the light patterns, the height data that were specified from the first measurement values and the second measurement values are obtained as height data for these entirely irradiated regions WA1 and WA2. On the other hand, in the partially irradiated regions WB1 and WB2 irradiated by only the first light pattern or the second light pattern, the supplemental data were calculated based on height data for the entirely irradiated regions WA1 and WA2. Thereafter, based on these calculated supplemental data, the fringe order of the first measurement value or the second measurement value for the partially irradiated regions WB1 and WB2 is specified, and height data corresponding to the first measurement value or second measurement value of this fringe order is acquired as the height data for this partially irradiated region WB1 and WB2.

By this means, more highly accurate height data can of course be acquired for the entirely irradiated regions WA1 and WA2 where there is irradiation by both the first light pattern and the second light pattern. In addition, more highly precise height data can be acquired by this means for the partially irradiated regions WB1 and WB2 where there is irradiation by only one of the two light patterns.

If the shapes included in the partially irradiated regions WB1 and WB2 are assumed to be relatively flat, it is thought that the supplementary data obtained by linear supplementation or the like can be used without modification, and such supplementary data may be adopted as height data for these partially irradiated regions WB1 and WB2. However, the partially irradiated regions WB1 and WB2 of the cream solder H are not necessarily shaped in this manner, and the shapes may become relatively irregular and may have undulations. Therefore, the adoption of the actual measurement values (i.e., height data corresponding to the first measurement value or the second measurement value of a certain fringe order) is preferred from the standpoint of the ability to obtain a value that is the true value.

In addition, the irradiation devices 4A and 4B of the present embodiment are placed at positions that are mutually opposed and that sandwich the printed board 2 within a plane (x-y plane) as viewed in the imaging direction of the camera 5, i.e., along the approximately vertical direction (z axis direction). Therefore, there is reduced likelihood that a shadowed part may occur where either the first light pattern or the second light pattern is not irradiated, and the aforementioned operational effect can be made more reliable.

Moreover, the described details of the aforementioned embodiment are not limiting, and for example, the following modifications may be used. It is noted that the below described embodiments are illustrative. Accordingly, other modified examples and example applications are possible.

(a) The board inspection apparatus 1 of the aforementioned embodiment used a device for measurement of three dimensional shape to measure height of the cream solder H formed by printing on a printed board 2. However, this embodiment is not limiting, and a configuration may be used that measures height of a different object such as a solder bump printed on a board, an electronic component mounted on a board, or the like.

(b) The aforementioned embodiment was an example of performance of measurement up to a height of 1500 μm by combination of a first light pattern having a pitch of 600 μm and a second light pattern having a pitch of 800 μm. It is noted that the pitch of each light pattern and the measurement range are not limited to these values. For example, a configuration may be used that shortens the pitch of the first light pattern (e.g. to become 400 μm) and is capable of measurement using the first light pattern over a range of at least 4 fringe orders.

Here, by reducing the difference between the pitch of the first light pattern and the pitch of the second light pattern, it is possible to decrease the difference between the precision of measurement of the partially irradiated region WB1 irradiated only by the first light pattern and the precision of measurement of the partially irradiated region WB2 irradiated only by the second light pattern.

(c) According to the aforementioned embodiment, a configuration was used that irradiated two patterns of light of different pitches onto the printed board 2 from two respective directions. This configuration is not limiting, and a configuration may be used that irradiates 3 or more light patterns of different frequencies from 3 or more respective directions.

Of course, a configuration may be used that irradiates the same type (same pitch) of light pattern from multiple directions rather than just irradiating one type of light from a single direction. For example, a pair of irradiation devices as a first irradiation device 4A and a pair of irradiation devices as a second irradiation device 4B may be provided and disposed opposingly as in the aforementioned embodiment, and a configuration may be adopted (see FIG. 10) where the 4 irradiation devices 4A and 4B are disposed with a 90° gap therebetween as viewed from the printed board 2.

However, this configuration may result in the occurrence of partially irradiation regions (see the slanting part of FIG. 10) that are irradiated by only the first light pattern or the second light pattern.

Figure 11:
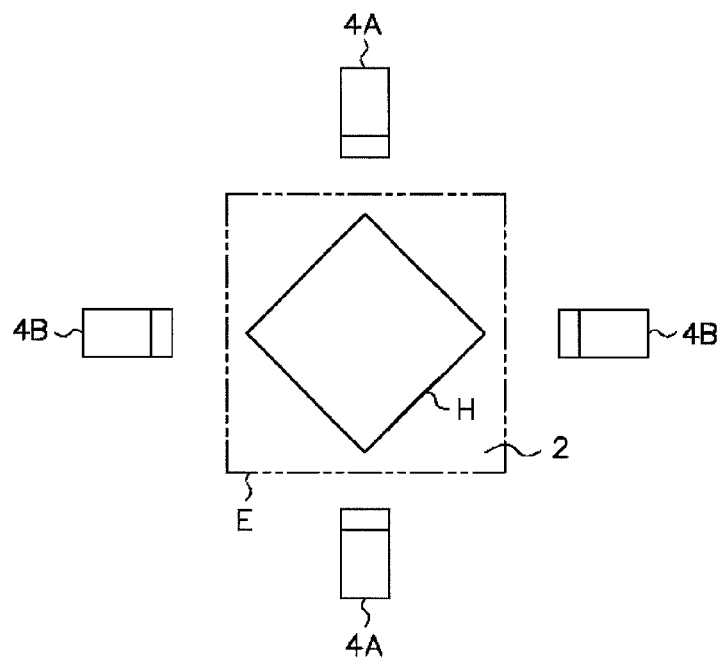
FIG. 11 is a planar schematic drawing showing the layout of the irradiation devices according to a separate embodiment.

In contrast, for example, a configuration (see FIG. 11) may be used in which a pair of the first irradiation devices 4A and a pair of the second irradiation devices 4B are provided, the first irradiation devices 4A and the second irradiation devices 4B are disposed with a 90° gap therebetween as viewed from the printed board 2 (i.e., the two first irradiation devices 4A are opposingly deposed, and the two second irradiation devices 4B are opposingly deposed).

Figure 10:
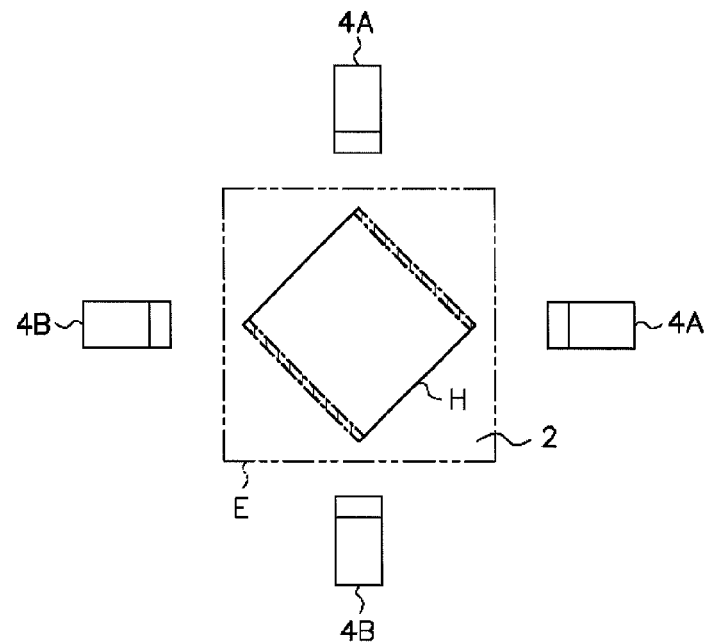
FIG. 10 is a planar schematic drawing showing the layout of the irradiation devices according to a separate embodiment.

In comparison to the configuration cited above for FIG. 10, this configuration is able to greatly decrease the portion occupied by the partially irradiated region irradiated by only the first light pattern or the second light pattern. As a result, it is possible to perform measurement of higher precision.

(d) Each of the light patterns according to the aforementioned embodiment was irradiated along the x-axis direction parallel to a pair of sides of the rectangular shaped printed board 2. That is, the resultant configuration irradiated the lines of the light pattern orthogonally relative to the x-axis direction, i.e., parallel to the y-axis direction. This configuration is not limiting, and for example, a configuration may be adopted that irradiates the light patterns such that the lines of the light pattern intersect with each side of the rectangular printed board 2 or the camera 5 visual field (inspection area E) at a tilted angle (e.g., 45° as seen in planar view).

(e) Although the multiple irradiation devices 4A and 4B of the aforementioned embodiment were disposed equally spaced apart as viewed in the plane of the printed board 2, there is no requirement that the multiple irradiation devices 4A and 4B be disposed equally spaced apart, and the placement of each of the irradiation devices 4A and 4B may be determined according to the structure of the printed board 2 or the like.

(f) During acquisition of the supplemental data for the partially irradiated regions WB1 and WB2 during the aforementioned embodiment, a configuration was used that performed linear supplementation based on height data of the entirely irradiated regions WA1 and WA2. However, the method of acquisition of the supplemental data is not limited to this configuration, and it is possible to use a configuration based on a different method.

(g) During specification of the fringe order of the measurement values by the aforementioned embodiment for the partially irradiated regions WB1 and WB2 based on the supplemental data, a configuration was used that specified the fringe order nearest to supplemental data for a certain measurement subject point as the fringe order for that measurement subject point (i.e., fringe order of the range including the supplemental data). However, the method of specification of the fringe order of the measurement values for the partially irradiated regions WB1 and WB2 is not limited to this method, and a configuration may be used that performs specification by another method. For example, a configuration may be used where an average value of supplemental data within a certain area formed by multiple adjacent measurement subject points (pixels) is calculated, and the fringe order (fringe order of a range that includes the average value) nearest to that average value is specified as the fringe order for this certain area.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE CHARACTERS

1 . . . board inspection apparatus
2 . . . printed board
4A . . . first irradiation device
4B . . . second irradiation device
5 . . . camera
6 . . . control device
E . . . inspection area
H . . . cream solder
WA1, WA2 . . . entirely irradiated region
WB1, WB2 . . . partially irradiated region

What is claimed is:

1. A device for measuring three dimensional shape comprising:
 a first irradiation unit configured to irradiate a first light pattern of a first pitch and having a striped light intensity distribution from a first position upon a object to be measured;
 a second irradiation unit configured to irradiate a second light pattern of a second pitch and having a striped light intensity distribution from a second position upon a object to be measured, the second pitch being longer than the first pitch, and the second position being different from the first position;
 an imaging unit configured to image the object to be measured irradiated by the light patterns; and
 an image processing unit configured to perform three dimensional measurement based on an image data imaged by the imaging unit;
 wherein the imaging processing unit comprises:
 a first measurement value acquisition unit configured to perform three dimensional measurement by the phase shift method based on a multiplicity of image data obtained by multiply irradiating the first light pattern using multiple different phases and by the imaging by the imaging unit, and to acquire as a first measurement value the measurement value obtained by the three dimensional measurement of the first measurement value acquisition unit;
 a second measurement value acquisition unit configured to perform three dimensional measurement by the phase shift method based on a multiplicity of image data obtained by multiply irradiating the second light pattern using multiple different phases and by the imaging by the imaging unit, and to acquire as a second measurement value the measurement value obtained by the three dimensional measurement of the second measurement value acquisition unit;
 a first height data acquisition unit configured to acquire a height data specified from the first measurement value and the second measurement value relating to an entirely irradiated region irradiated by the first light pattern and the second light pattern, and to use the acquired specified height data as a height data for the entirely irradiated region;
 a supplemental data acquisition unit configured to acquire, based on the height data for the entirely irradiated region, a supplemental data relating to a partially irradiated region that is irradiated by only the first light pattern or the second light pattern; and
 a second height acquisition unit configured to specify a fringe order of the first measurement value or the second measurement value for the partially irradiated region based on the supplemental data, and to acquire as height data for the partially irradiated region a height data corresponding to the first measurement value or the second measurement value of the fringe order that was specified,
 wherein, as seen in a planar view looking along the imaging direction (approximately vertical direction) of the imaging unit, the first irradiation unit and the second irradiation unit are opposingly disposed at positions so as to sandwich the object to be measured therebetween.

2. A device for measuring three dimensional shape comprising:
 a first irradiation unit configured to irradiate a first light pattern of a first pitch and having a striped light intensity distribution from a first position upon a object to be measured;
 a second irradiation unit configured to irradiate a second light pattern of a second pitch and having a striped light intensity distribution from a second position upon a object to be measured, the second pitch being longer than the first pitch, and the second position being different from the first position;
 an imaging unit configured to image the object to be measured irradiated by the light patterns; and
 an image processing unit configured to perform three dimensional measurement based on an image data imaged by the imaging unit;
 wherein the imaging processing unit comprises:
 a first measurement value acquisition unit configured to perform three dimensional measurement by the phase shift method based on a multiplicity of image data obtained by multiply irradiating the first light pattern using multiple different phases and by the imaging by the imaging unit, and to acquire as a first measurement value the measurement value obtained by the three dimensional measurement of the first measurement value acquisition unit;
 a second measurement value acquisition unit configured to perform three dimensional measurement by the phase shift method based on a multiplicity of image data obtained by multiply irradiating the second light pattern using multiple different phases and by the imaging by the imaging unit, and to acquire as a second measurement value the measurement value obtained by the three dimensional measurement of the second measurement value acquisition unit;

a first height data acquisition unit configured to acquire a height data specified from the first measurement value and the second measurement value relating to an entirely irradiated region irradiated by the first light pattern and the second light pattern, and to use the acquired specified height data as a height data for the entirely irradiated region;

a supplemental data acquisition unit configured to acquire, based on the height data for the entirely irradiated region, a supplemental data relating to a partially irradiated region that is irradiated by only the first light pattern or the second light pattern; and a second height acquisition unit configured to specify a fringe order of the first measurement value or the second measurement value for the partially irradiated region based on the supplemental data, and to acquire as height data for the partially irradiated region a height data corresponding to the first measurement value or the second measurement value of the fringe order that was specified, wherein the device for measuring three dimensional shape comprises a pair of the first irradiation units and a pair of the second irradiation units; and as seen in a planar view looking along the imaging direction of the imaging unit and centered on the object to be measured, the first irradiation units and the second irradiation units are alternatingly disposed with 90° spacing there between.

* * * * *